(12) United States Patent
Reid et al.

(10) Patent No.: US 8,948,415 B1
(45) Date of Patent: Feb. 3, 2015

(54) MOBILE DEVICE WITH DISCRETIONARY TWO MICROPHONE NOISE REDUCTION

(75) Inventors: Peter K Reid, Marlborough (GB); John S Graham, Scotts Valley, CA (US); Gregory H Miller, Scotts Valley, CA (US); Thomas G Criswell, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1374 days.

(21) Appl. No.: 12/605,557

(22) Filed: Oct. 26, 2009

(51) Int. Cl.
*H04B 15/00* (2006.01)
*H04M 1/00* (2006.01)

(52) U.S. Cl.
USPC ............................. 381/94.1; 455/574

(58) Field of Classification Search
USPC ......... 381/92, 94.1, 94.2, 94.3, 94.7; 455/574
See application file for complete search history.

(56) References Cited

U.S. PATENT DOCUMENTS

| | | | |
|---|---|---|---|
| 4,901,354 A | | 2/1990 | Gollmar et al. |
| 6,549,630 B1 * | | 4/2003 | Bobisuthi .................... 381/94.7 |
| 7,191,105 B2 | | 3/2007 | Holzrichter et al. |
| 7,983,907 B2 * | | 7/2011 | Visser et al. .................. 704/227 |
| 2004/0133421 A1 | | 7/2004 | Burnett et al. |
| 2006/0120537 A1 | | 6/2006 | Burnett et al. |
| 2007/0154031 A1 * | | 7/2007 | Avendano et al. .............. 381/92 |
| 2007/0233479 A1 | | 10/2007 | Burnett |
| 2010/0022283 A1 | | 1/2010 | Terlizzi |

FOREIGN PATENT DOCUMENTS

EP 0637187 A1 2/1995

OTHER PUBLICATIONS

S. F. Boll "Suppression of acoustic noise in speech using spectral subtraction", IEEE Trans. Acoust., Speech, Signal Process., vol. 27, No. 2, pp. 113-120, 1979.*
R. Martin, "Spectral subtraction based on minimum statistics", Proc. 7th Eur. Signal Processing Conf. (EUSIPC0',94), pp. 1182-1185, 1994.*

* cited by examiner

*Primary Examiner* — Duc Nguyen
*Assistant Examiner* — Kile Blair
(74) *Attorney, Agent, or Firm* — Chuang Intellectual Property Law

(57) ABSTRACT

Methods and systems for power conservation in mobile devices are presented. In one example, a mobile communication device includes a first microphone and a second microphone. The mobile communication monitors an ambient noise level and responsive to the ambient noise level operates the mobile communication device in a normal operation mode or a power conservation mode. In power conservation mode, use of the second microphone is discretionary.

22 Claims, 11 Drawing Sheets

MOBILE DEVICE WITH DISCRETIONARY TWO MICROPHONE NOISE REDUCTION

BACKGROUND OF THE INVENTION

Mobile electronic devices typically employ a rechargeable battery to allow for wireless operation. Competing factors affect the design of these mobile devices. For example, users desire that the mobile device have a long battery life so that the mobile device does not require frequent recharging. However, users also typically desire that the mobile device be lightweight or have a small physical form factor, thus prohibiting simply using a large battery to provide extended wireless operation. Depending on the particular type of mobile device involved, the balance between competing factors may shift. For example, wireless headsets may require a smaller form factor and lighter weight relative to other types of mobile devices.

Power management techniques enable battery life to be extended by efficiently managing power consumption. For example, some mobile devices may have a "sleep" mode whereby the mobile device enters a low power consumption state when not in use. However, as the type and performance requirements of mobile electronic devices vary, there is a need for improved methods and apparatuses for power management.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
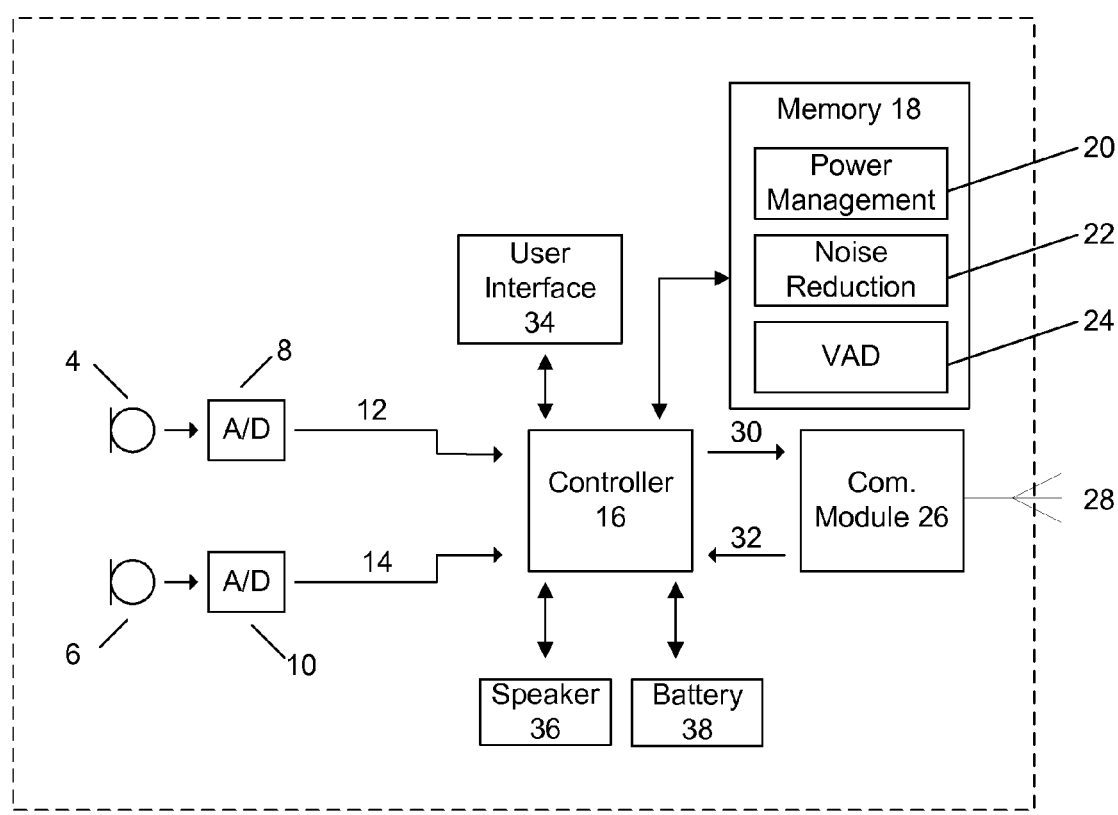
FIG. 1 illustrates a simplified block diagram of a headset utilizing power management in one example.

Methods and apparatuses for power management and noise reduction are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Mobile communication devices, such as mobile telephones and wireless headsets, must often address background noise caused by a variety of noise sources in the user's vicinity. Such background noise may include, for example, people conversing nearby, wind noise, machinery noise, ventilation noise, loud music and intercom announcements in public places. These noise sources may either be diffuse or point noise sources.

Background noise may be reduced using digital signal processing techniques applying noise reduction algorithms. In one example, a signal from a single microphone is utilized. A device microphone receives an acoustic signal. The microphone is coupled to an analog to digital (A/D) converter which outputs a digital signal. The digital signal is provided to a digital signal processor (DSP) for processing to remove background stationary noise utilizing a noise reduction algorithm. A processed signal with reduced noise is then output.

In another example, signals from two or more microphones are utilized. Noise reduction algorithms utilizing the output signals from more than one microphone are particularly effective in reducing far field speech or "babble" noise in high noise environments. However, such algorithms require intensive signal processing, thereby resulting in greater power consumption.

Multi-microphone headsets offer superior transmit signal noise reduction, but there is a power consumption penalty for enabling and processing audio data from two microphones which can have a profound effect on the talk-time of these small form factor headsets. These headsets may, for example, be Bluetooth headsets. The two microphone wireless audio system has a higher current consumption than a single microphone system. The higher current consumption results from the power requirements of the additional microphone itself, the additional microphone gain amplifiers, the additional analog to digital (A/D) converter, additional buffer memory requirements, and additional digital signal processing on the second microphone audio signal data. As a consequence, talk-time is reduced compared to a single microphone system.

Headsets are used in multiple audio gateways and in different environments. In typical headset usage, the user is in a quiet office or home at certain times, while at other times is in higher ambient noise locations, such as a car, airport or café. Furthermore, during use, the user may also transition between low noise and high noise environments. During times of low ambient noise, the noise reduction processing required in high noise environments is not needed, and therefore the second microphone whose output is used primarily for noise reduction processing is not required. In one example of the invention, a mobile device detects the ambient noise conditions and powers down the second microphone and associated supporting hardware and digital signal processing in low ambient noise situations, thus preserving battery life and therefore extending talk-time while operating in single microphone mode. Lower power requirement noise reduction techniques applicable to a single microphone signal are used. The mobile device reestablishes dual microphone noise reduction when high ambient noise conditions are subsequently detected. In this manner, operation of the second microphone is discretionary and the mobile device switches between single microphone operation and dual microphone operation in a transparent manner to the user.

By utilizing adaptive noise reduction, the mobile device advantageously provides the benefits of a two microphone noise reduction system when it is required, while reducing power consumption and extending battery life when it is not. Advantageously, the mobile device is still operational during reduced power consumption operation. In a headset or wireless telephone use, the user can still participate in active calls during reduced power consumption operation.

In one example, a mobile communication device includes a first microphone to output a first signal, a second microphone to output a second signal, and a processor. The mobile communication device further includes a memory storing a power management module configured to monitor an ambient noise level utilizing the first signal or the second signal and responsive to the ambient noise level operate the mobile communication device in a normal operation mode or a power conservation mode.

In one example, a mobile communication device includes a first microphone to output a first signal on a first signal processing path, a second microphone to output a second signal on a second signal processing path, and a processor. The mobile communication device further includes a computer readable medium storing instructions that when executed by the processor cause the processor to monitor an ambient noise level and responsive to the ambient noise level switch between a dual microphone noise reduction processing mode and a single microphone noise reduction processing mode. The second microphone and second signal processing path are deactivated in the single microphone noise reduction processing mode.

In one example, a method for power conservation in a mobile communication device includes receiving a first signal from a first microphone and a second signal from a second microphone and monitoring an ambient noise level. The method includes switching from a normal operation mode to a power conservation mode responsive to the ambient noise level satisfying a first predetermined condition, where switching to the power conservation mode comprises deactivating power to the second microphone and deactivating any noise reduction processing associated with the second signal. The method further includes switching from the power conservation mode to the normal operation mode responsive to the ambient noise level satisfying a second predetermined condition, where switching to the normal operation mode comprises activating power to the second microphone and processing the first signal and the second signal using dual microphone noise reduction processing to generate an output signal with reduced noise.

FIG. 1 illustrates a simplified block diagram of a headset 2 utilizing power management in one example. Headset 2 may include a headset controller 16 that comprises a processor, memory and software/firmware to implement functionality as described herein. In one example, headset controller 16 may include a variety of processors, such as digital signal processors and conventional CPUs. In one example, a first processor is dedicated to processing digitized analog signals and a second processor handles call management and user interface operations. In a further example, a single processor, such as a 32-bit RISC microprocessor, manages all aspects of headset signal processing.

In the example shown in FIG. 1, a headset 2 includes a microphone 4, analog to digital (A/D) converter 8, microphone 6, analog to digital (A/D) converter 10, controller 16, user interface 34, speaker 36, battery 38, wireless communication module 26, and memory 18. Memory 18 includes a power management module 20, noise reduction module 22, and voice activity detector 24 executable by processor controller 16. Although illustrated separately, memory 18 may be integrated with controller 16. In one example, battery 38 is a rechargeable battery installed within the headset housing to provide power to the various components of the headset 2.

The headset controller 16 receives input from headset user interface 34 and manages audio data received from microphones 4 and 6 and audio from a far-end user sent to speaker 36. The headset controller 16 further interacts with wireless communication module 26 (also referred to herein as a transceiver) to transmit and receive wireless signals.

Wireless communication module 26 includes an antenna system 28. Wireless communication module 26 may use a variety of wireless communication technologies. For example, wireless communication module 26 is a Bluetooth, Digital Enhanced Cordless Telecommunications (DECT), or IEEE 802.11 communications module.

The headset user interface 34 may include a multifunction power, volume, mute, and select button or buttons. Other user interfaces may be included on the headset, such as a link active/end interface. It will be appreciated that numerous other configurations exist for the user interface.

Microphone 4 and microphone 6 detect the voice of a near end user which will be the primary component of the audio signal, and also detect any secondary components such as background noise and the output of the headset speaker. For example, microphone 4 and microphone 6 may be utilized as a linear microphone array. In a further example, the microphone array may comprise more than two microphones. Use of two or more microphones is beneficial to facilitate generation of high quality speech signals since desired vocal signatures can be isolated and destructive interference techniques can be utilized based on collected phase information. Because each microphone in the array is a fixed distance relative to each other, phase information can be utilized to better pinpoint the location of noise sources and reduce noise.

Microphone 4 and microphone 6 may be omni-directional microphones, directional microphones, or a mix of omni-directional and directional microphones. Each microphone in the microphone array at the headset is coupled to an analog to digital (A/D) converter. Referring again to FIG. 1, microphone 4 is coupled to A/D converter 8 and microphone 6 is coupled to A/D converter 10. The analog signal output from microphone 4 is applied to A/D converter 8 to form individual digital signal 12. Similarly, the analog signal output from microphone 6 is applied to A/D converter 10 to form individual digital signal 14. A/D converter 8 and A/D converter 10 include anti-alias filters for proper signal preconditioning.

In further examples, microphone arrays having an additional number of microphones and array shapes which are different than linear may be used. Additional microphones require additional A/D converters, plus the added noise reduction processing requirements for the larger array. In one example where more than two microphones are used, the additional microphones and associated components and processing are treated similar to the second microphone in power conservation mode. For example, during power conservation mode all microphones in the microphone array except the first microphone are deactivated along with their associated subsequent signal processing.

Digital signal 12 and digital signal 14 output from A/D converter 8 and A/D converter 10 are transmitted to controller 16 for processing as described herein. Digital signal 12 and digital signal 14 may include several signal components, including user voice and one or more noise sources.

Figure 2:
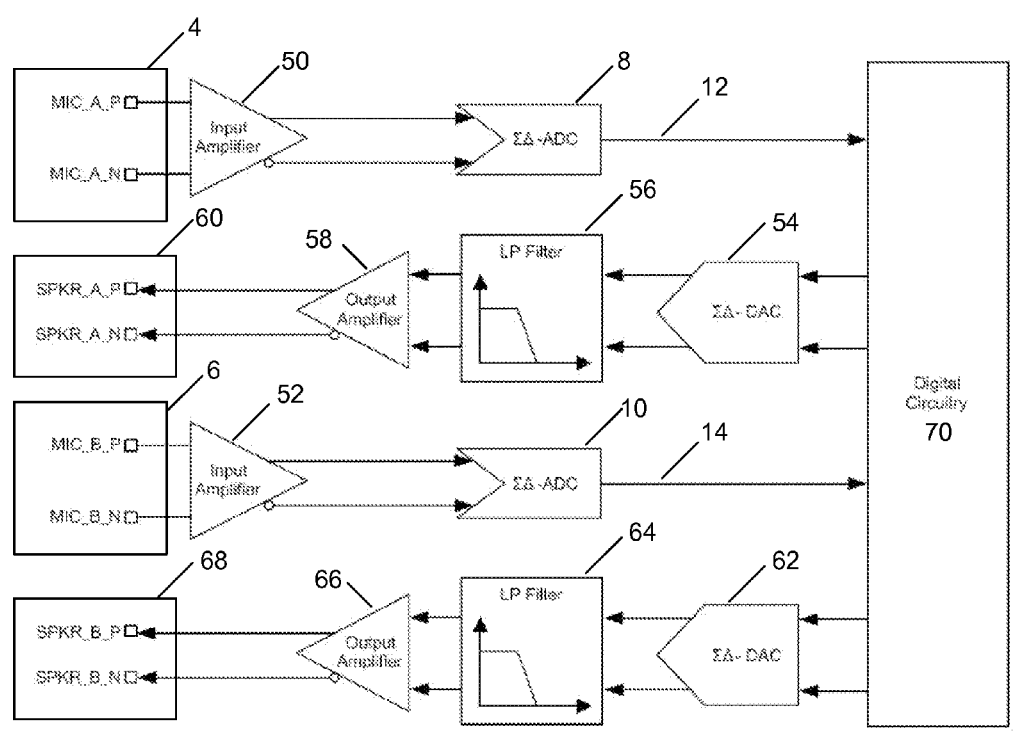
FIG. 2 is a diagram illustrating signal processing in the headset shown in FIG. 1.

FIG. 2 is a diagram illustrating signal processing in the headset shown in FIG. 1 in one example implementation. The output of microphone 4 is provided to an input amplifier 50, which outputs an amplified analog signal to A/D converter 8. A/D converter 8 converts the amplified signal to a digital signal 12 and provides it to digital circuitry 70. Digital circuitry 70 may, for example, be a digital signal processor at controller 16. Similarly, the output of microphone 6 is provided to an input amplifier 52, which outputs an amplified analog signal to A/D converter 10. A/D converter 10 converts the amplified signal to a digital signal 14 and provides it to digital circuitry 70. In one example, speaker 36 shown in FIG. 1 includes a pair of speakers 60, 68 shown in FIG. 2.

Digital circuitry 70 provides a receive digital signal to be output at speaker 60 to a digital to analog (D/A) converter 54, which converts the digital signal to an analog signal and outputs an analog signal to lowpass filter 56. The output of lowpass filter 56 is provided to an output amplifier 58 which amplifies the filtered analog signal and outputs it at speaker 60. Similarly, digital circuitry 70 provides a receive digital signal to be output at speaker 68 to a digital to analog (D/A) converter 62, which converts the digital signal to an analog signal and outputs an analog signal to lowpass filter 64. The output of lowpass filter 64 is provided to an output amplifier 66 which amplifies the filtered analog signal and outputs it at speaker 68.

Figure 3:
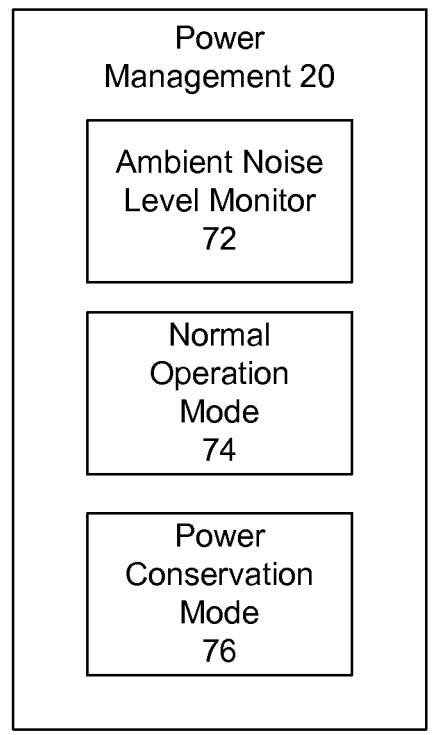
FIG. 3 illustrates a power management module in one example.

Referring again to FIG. 1, power management module 20 is configured to monitor an ambient noise level utilizing the digital signal 12, the digital signal 14, or both digital signal 12 and digital signal 14. Responsive to the ambient noise level, power management module 20 operates the headset 2 in a normal operation mode or a power conservation mode and switches therebetween as necessary. The monitored ambient noise levels are time weight averaged. FIG. 3 illustrates a power management module 20 in one example, whereby the power management module 20 includes an ambient noise level monitor 72 to monitor the ambient noise and determine various noise parameters as described and utilized herein, normal operation mode module 74 to operate headset 2 in normal operation mode, and power conservation mode module 76 to operate headset 2 in power conservation mode. In one example, when the headset 2 is operated in normal operation mode, the headset 2 operates in a dual microphone noise reduction processing mode whereby both digital signal 12 and digital signal 14 are processed. Upon initial power-on or establishment of an audio link, the headset 2 defaults to normal operation mode.

When the headset 2 is operated in a power conservation mode, the headset 2 operates in a single microphone noise reduction processing mode and processes only the signal from microphone 4. In the example configuration shown in FIG. 2, microphone 6 and the second signal processing path including amplifier 52, A/D converter 10, and processing at digital circuitry 70 are deactivated in the single microphone noise reduction processing mode.

In one example, the headset 2 switches to and is operated in power conservation mode when the ambient noise level is below a predetermined threshold average time weighted noise level (also referred to herein as the lower noise threshold). In one implementation, the threshold predetermined average time weighted noise level is between approximately 50 dBspl(A) and 55 dBspl(A). In a further example, the headset 2 switches to and is operated in power conservation mode when the ambient noise level is both below a predetermined threshold average time weighted noise level and has a peak to average noise ratio below a predetermined threshold peak to average noise ratio. The peak to average noise ratio parameter provides an indication of the type of noise present, including whether the ambient noise is both stationary and dynamic. In one implementation, the predetermined threshold peak to average noise ratio is between approximately 6 dB and 12 dB.

In one example, a switch to power conservation mode occurs only if the ambient noise is both below the lower noise threshold and below the predetermined threshold peak to average noise ratio for a predetermined time. The predetermined time may, for example, be somewhere within the range of 15 to 60 seconds. The switch to power conservation mode occurs within a given release time. For example, the release time may be between 15 and 20 seconds. Release times within this range advantageously prevent the headset 2 from switching between operational modes too frequently during a given call, as the noise reduction algorithms and acoustic echo control (AEC) need to re-converge and some additional noise and artifacts will occur during the transition.

While in power conservation mode, the headset 2 continues to monitor the background noise level. In one example, the headset 2 reverts back to and is operated in normal operation mode when the ambient noise level is above a predetermined threshold average time weighted noise level (also referred to herein as the upper noise threshold) or the ambient noise level exceeds the predetermined threshold peak to average noise ratio. In one implementation, the upper noise threshold is between approximately 60 dBspl(A) and 65 dBspl(A) and the predetermined threshold peak to average noise ratio is between approximately 6 dB and 12 dB.

A switch from power conservation mode to normal operation mode occurs within a given attack time. For example, the attack time may advantageously be between 1 and 10 seconds. An attack time within this range is short enough so that if the noise level exceeds a threshold at which the single microphone noise reduction cannot cope, the dual microphone noise reduction system is rapidly activated, but long enough so that short term impulse noise does not cause a switch.

In one example, voice activity detector 24 is configured to determine the presence of user speech or absence of user speech in the first signal or the second signal, whereby the power management module switches between normal operation mode and power conservation mode only during absence of user speech. In this manner, any audible switching artifacts which may affect intelligibility of the user voice are avoided.

Figure 4:
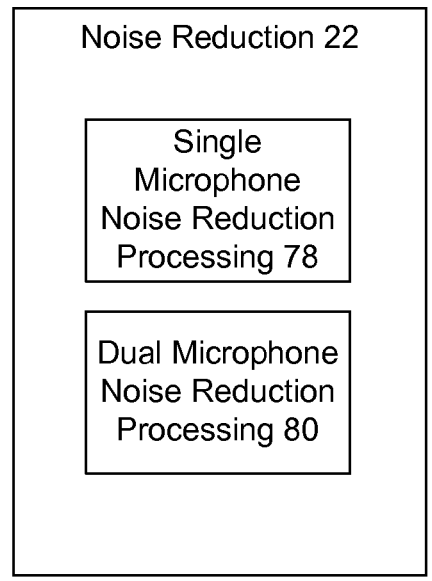
FIG. 4 illustrates a noise reduction module in one example.

Values for the various system parameters described may be selected to prevent undesirable system "hunting" between power conservation mode and normal operation mode. In one embodiment, the inventors believe the following values to optimize performance of the single/dual microphone switching system:

Lower noise threshold 52 dBA
Upper noise threshold 62 dBA
Attack time (1← →2 mic mode) 3 seconds
Release time (2← →1 mic mode) 15-20 seconds
Threshold Peak to Average noise ratio between 6 dB and 12 dB FIG. 4 illustrates a noise reduction module 22 in one example. Noise reduction module 22 includes a single microphone noise reduction processing module 78 for noise reduction processing of a single microphone output signal and also includes a dual microphone noise reduction processing module 80 for noise reduction processing using two microphone output signals. Referring to FIG. 1 and FIG. 4, during dual microphone noise reduction processing mode operation, dual microphone noise reduction processing module 80 processes digital signal 12 and digital signal 14 to remove background noise utilizing a noise reduction algorithm. A processed signal 30 is output from dual microphone noise reduction processing module 80 for transmission to a far-end user.

Dual microphone noise reduction processing module 80 may comprise any combination of several noise reduction techniques known in the art to enhance the vocal to non-vocal signal quality and provide a final processed digital output signal. Dual microphone noise reduction processing module 80 utilizes both digital signal 12 and digital signal 14 to maximize performance of the noise reduction algorithms Dual microphone noise reduction processing module 80 may also utilize a far-end voice signal 32 in the noise reduction algorithms. Each noise reduction technique may address different noise artifacts present in the voice and noise signal. Such techniques may include, but are not limited to noise subtraction, spectral subtraction, dynamic gain control, and independent component analysis. In one example implementation, noise reduction processing using the digital signal 12 and the digital signal 14 is a combination of, but not limited to, a blind source separation algorithm, beam forming algorithms, arrays and coherence analysis, and a following noise filtering algorithm such as a form of spectral subtraction based residual noise reduction system or other single channel noise reduction system. An example usage scenario with multiple noise sources is discussed in reference to FIG. 8 below.

During single microphone noise reduction processing mode operation, single microphone noise reduction processing 78 processes the single digital signal 12 using a noise reduction algorithm requiring less processing power, and therefore less battery power, than a multi-microphone noise reduction algorithm. In one example implementation, a spectral subtraction based residual noise reduction system operates to reduce noise in the single microphone output signal. Other approaches for single channel noise reduction, based on digital signal processing, may also be used.

Figure 5A:
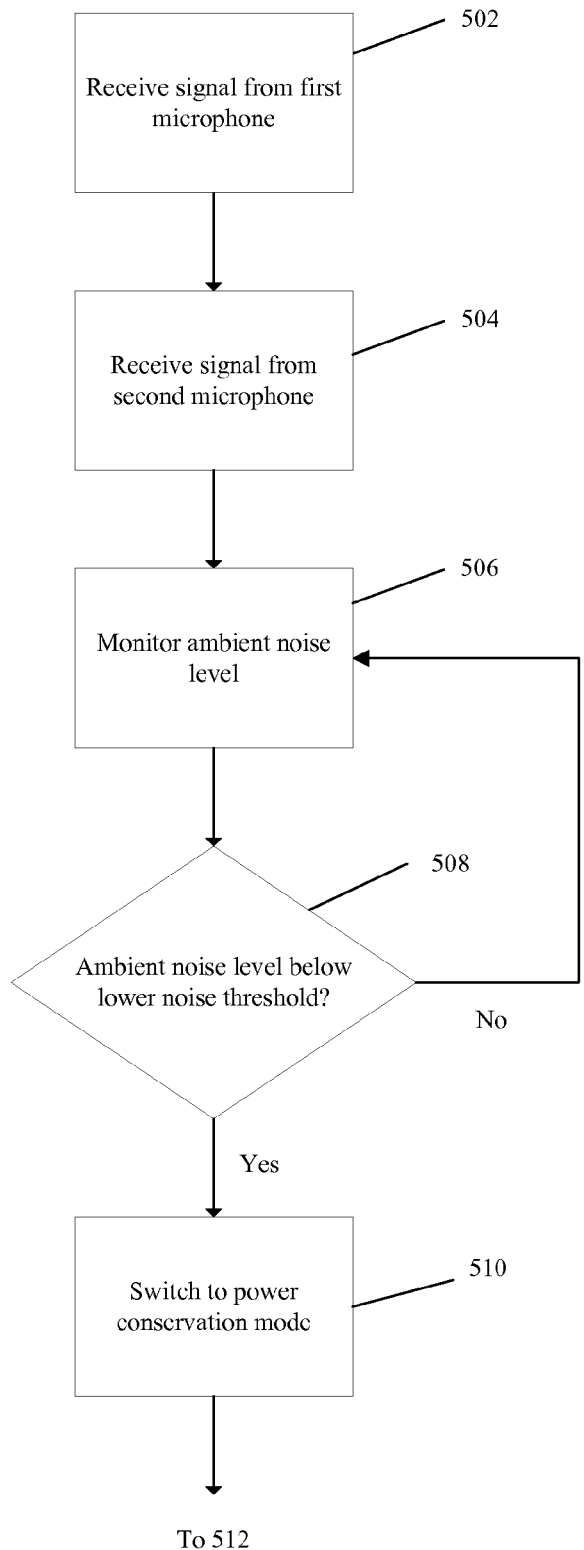
FIGS. 5A and 5B are a flow diagram illustrating a power management process for a mobile device in one example.
Figure 5B:
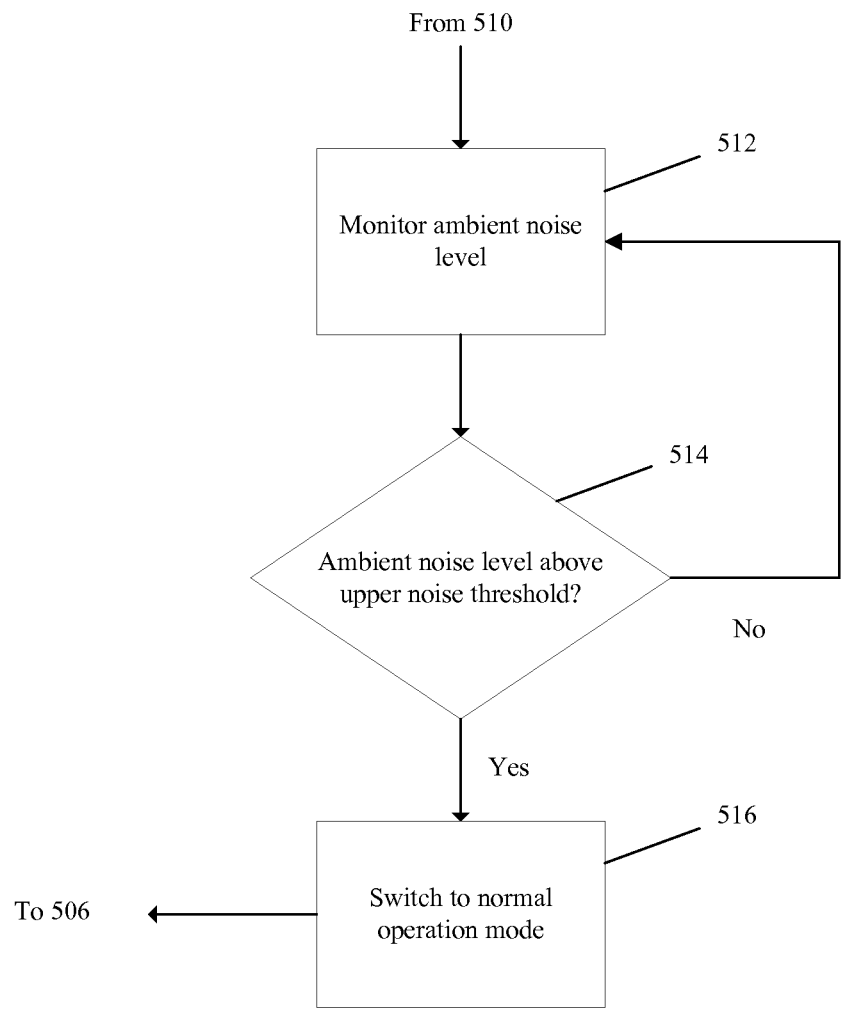

FIGS. 5A and 5B are a flow diagram illustrating a power management process for a mobile device such as a wireless headset in one example. At block 502, a signal is received from a first microphone at the wireless headset. At block 504, a signal is received from a second microphone at the wireless headset. At block 506, the ambient noise level is monitored. In one example, the ambient noise level is monitored from both the first microphone signal output and the second microphone signal output. In a further example, the ambient noise level is monitored using only a single microphone output signal.

The ambient noise level is monitored to determine whether a predetermined condition is satisfied which triggers a switch to a power conservation mode. In this example, at decision block 508, it is determined whether the ambient noise level is below a lower noise threshold. In one example, the lower noise threshold is a predetermined average time weighted noise level. If no at decision block 508, the process returns to block 506 to continue monitoring the ambient noise level. If yes at decision block 508, at block 510 the wireless headset switches to a power conservation mode.

In one example, switching to the power conservation mode includes deactivating power to the second microphone and deactivating any noise reduction processing associated with the second microphone signal. In one example, switching from a normal operation mode to a power conservation mode occurs at a predetermined release time. In one example, the predetermined release time is between approximately 15 and 20 seconds.

At block 512, the ambient noise level is monitored. The ambient noise level is monitored to determine whether a predetermined condition is satisfied which triggers a switch back to a normal operation mode. In this example, at decision block 514, it is determined whether the ambient noise level is above an upper noise threshold. If no at decision block 514, the process returns to block 512 to continue monitoring the ambient noise level. If yes at decision block 514, at block 516, the wireless headset switches to a normal operation mode. Following block 516 the process returns to block 506.

In one example, switching to the normal operation mode including activating power to the second microphone and processing the first signal and the second signal using dual microphone noise reduction processing to generate an output signal with reduced noise. In one example, switching from the power conservation mode to the normal operation mode occurs at a predetermined attack time. In one example, the predetermined attack time is between approximately 1 and 10 seconds. In one example, dual microphone noise reduction processing comprises a blind source separation algorithm followed by a spectral subtraction based noise reduction algorithm.

Figure 6A:
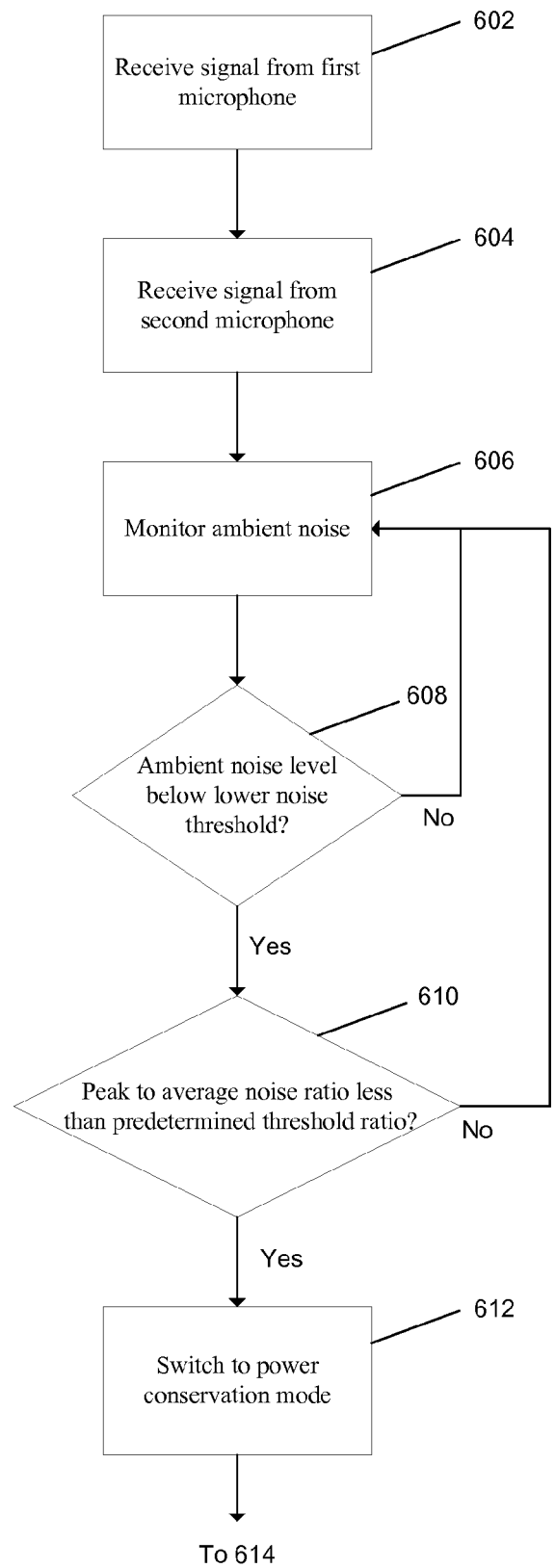
FIGS. 6A and 6B are a flow diagram illustrating a power management process for a mobile device in a further example.
Figure 6B:
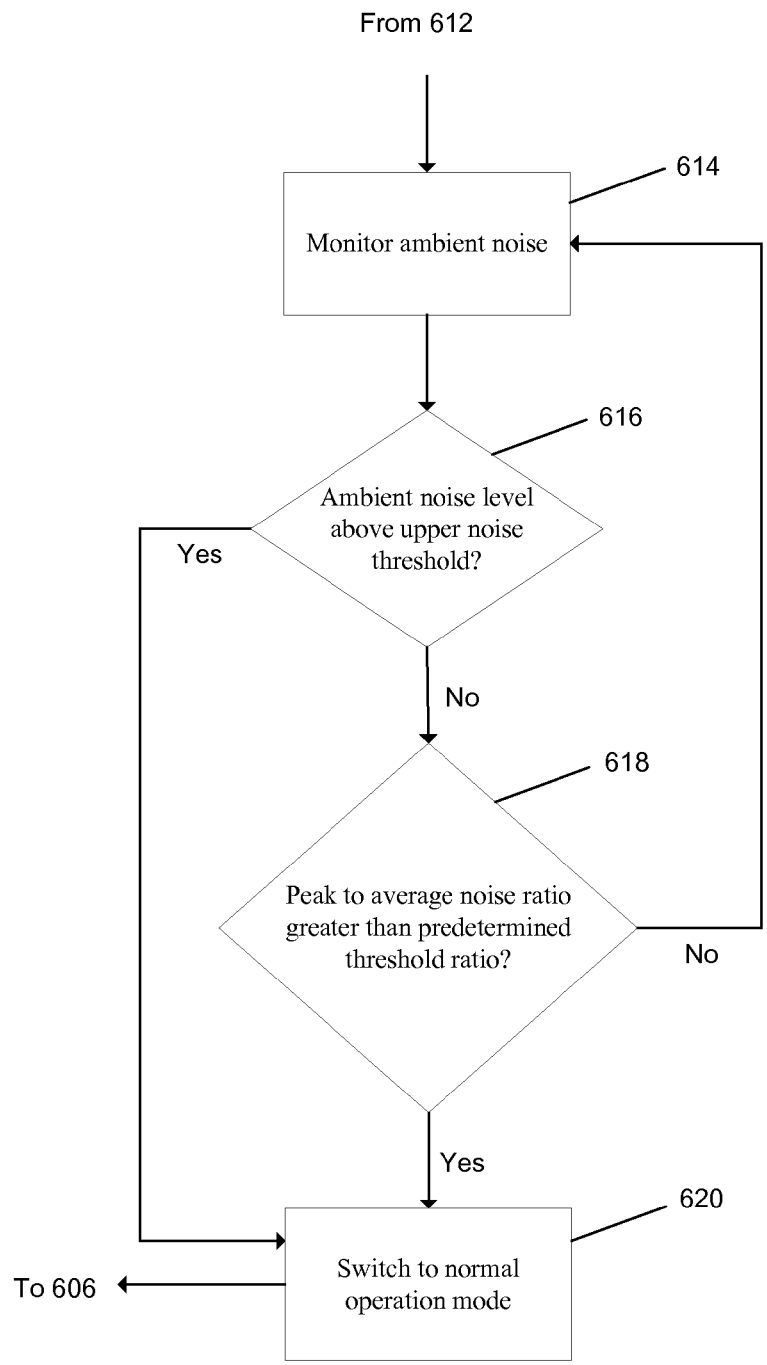

FIGS. 6A and 6B are a flow diagram illustrating a power management process for a mobile device such as a wireless headset in a further example. At block 602, a signal is received from a first microphone at the wireless headset. At block 604, a signal is received from a second microphone at the wireless headset. At block 606, the ambient noise is monitored. In one example, the ambient noise is monitored from both the first microphone signal output and the second microphone signal output. In a further example, the ambient noise is monitored using only a single microphone output signal.

In this example, the ambient noise is monitored to determine whether two predetermined conditions are satisfied to trigger a switch to a power conservation mode. At decision block 608, it is determined whether the ambient noise is below a lower noise threshold. In one example, the lower noise threshold is a predetermined average time weighted noise level. If no at decision block 608, the process returns to block 606 to continue monitoring the ambient noise level. If yes at decision block 608, at decision block 610 it is determined whether the ambient noise has a peak to average noise ratio less than a predetermined threshold peak to average noise ratio. If no at decision block 610, a switch to power conservation mode does not occur and the process returns to block 606. If yes at decision block 610, at block 612 the wireless headset switches to a power conservation mode.

In one example, switching to the power conservation mode includes deactivating power to the second microphone and deactivating any noise reduction processing associated with the second microphone signal. In one example, switching from a normal operation mode to a power conservation mode occurs at a predetermined release time. In one example, the predetermined release time is between approximately 15 and 20 seconds.

At block 614, the ambient noise is monitored. In this example, the ambient noise is monitored to determine whether either of two predetermined conditions is satisfied to trigger a switch back to a normal operation mode. At decision block 616, it is determined whether the ambient noise level is above an upper noise threshold. If yes at decision block 616, the process proceeds to block 620. At block 620 the wireless headset switches to a normal operation mode.

If no at decision block 616, the process proceeds to decision block 618. At decision block 618, it is determined whether the ambient noise has a peak to average noise ratio greater than the predetermined threshold peak to average noise ratio. If no at decision block 618, the process returns to block 614. If yes at decision block 618, at block 620 the wireless headset switches to a normal operation mode. Following block 620 the process returns to block 606.

In a further example, both the predetermined conditions at decision block 616 and decision block 618 must indicate yes in order to proceed to block 620 at which the wireless headset switches to a normal operation mode.

Figure 7A:
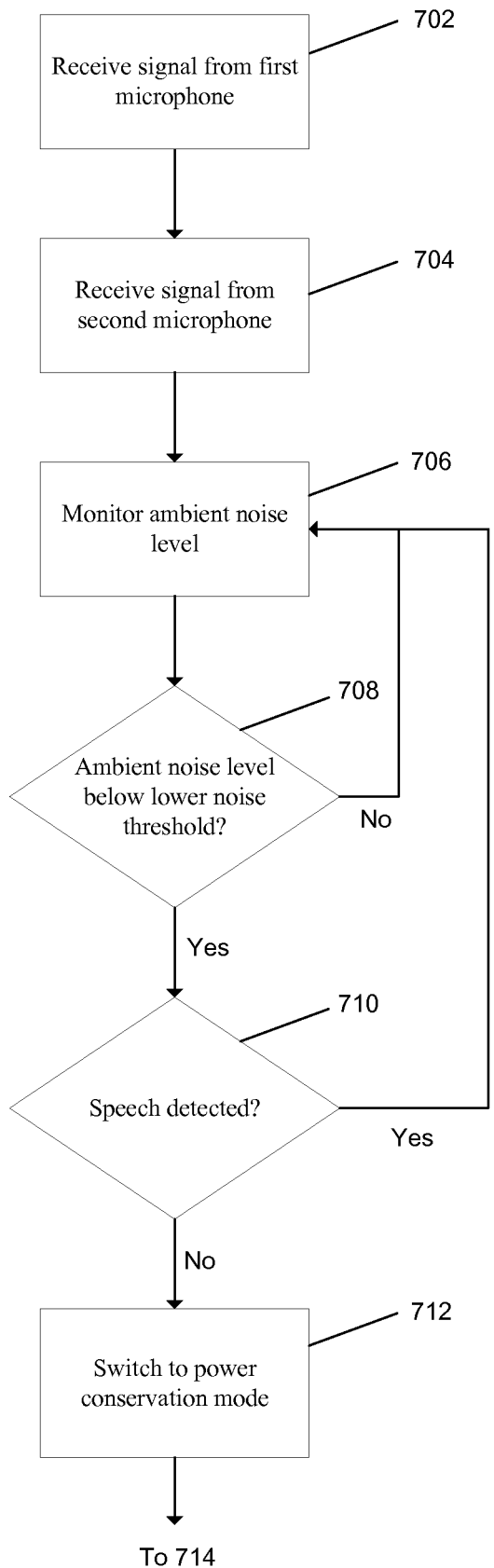
FIGS. 7A and 7B are a flow diagram illustrating a power management process for a mobile device in a further example.
Figure 7B:
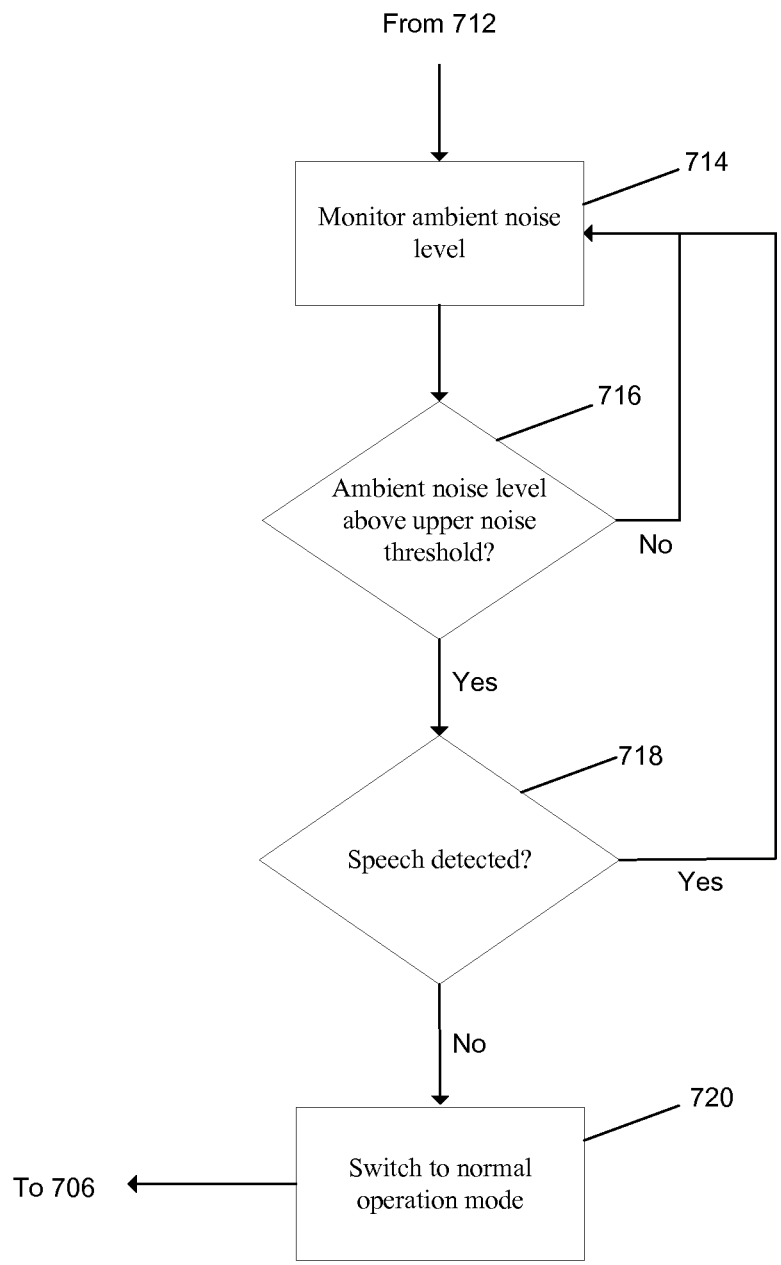

FIGS. 7A and 7B are a flow diagram illustrating a power management process for a mobile device in a further example. In this example process, the presence of user speech or absence of user speech is determined, and switching from a normal operation mode to a power conservation mode or switching from the power conservation mode to the normal operation mode occurs only during absence of user speech.

At block 702, a signal is received from a first microphone at the wireless headset. At block 704, a signal is received from a second microphone at the wireless headset. At block 706, the ambient noise level is monitored. The ambient noise level is monitored to determine whether a predetermined condition is satisfied to trigger a switch to a power conservation mode. At decision block 708, it is determined whether the ambient noise level is below a lower noise threshold. In one example, the lower noise level is a predetermined average time weighted noise level. If no at decision block 708, the process returns to block 706 to continue monitoring the ambient noise level. If yes at decision block 708, at decision block 710 it is determined whether user speech is detected. If yes at decision block 710, a switch to power conservation mode does not occur and the process returns to block 706. If no at decision block 710, at block 712 the wireless headset switches to a power conservation mode.

At block 714, the ambient noise level is monitored. In this example, the ambient noise level is monitored to determine whether a predetermined condition is satisfied to trigger a switch back to a normal operation mode. At decision block 716, it is determined whether the ambient noise level is above an upper noise threshold. If no at decision block 716, the process returns to block 714. If yes at decision block 716, the process proceeds to decision block 718. At decision block 718 it is determined whether user speech is detected. If yes at decision block 718, a switch to normal operation mode does not occur and the process returns to block 714. If no at decision block 718, at block 720 the wireless headset switches to a normal operation mode.

Figure 8:
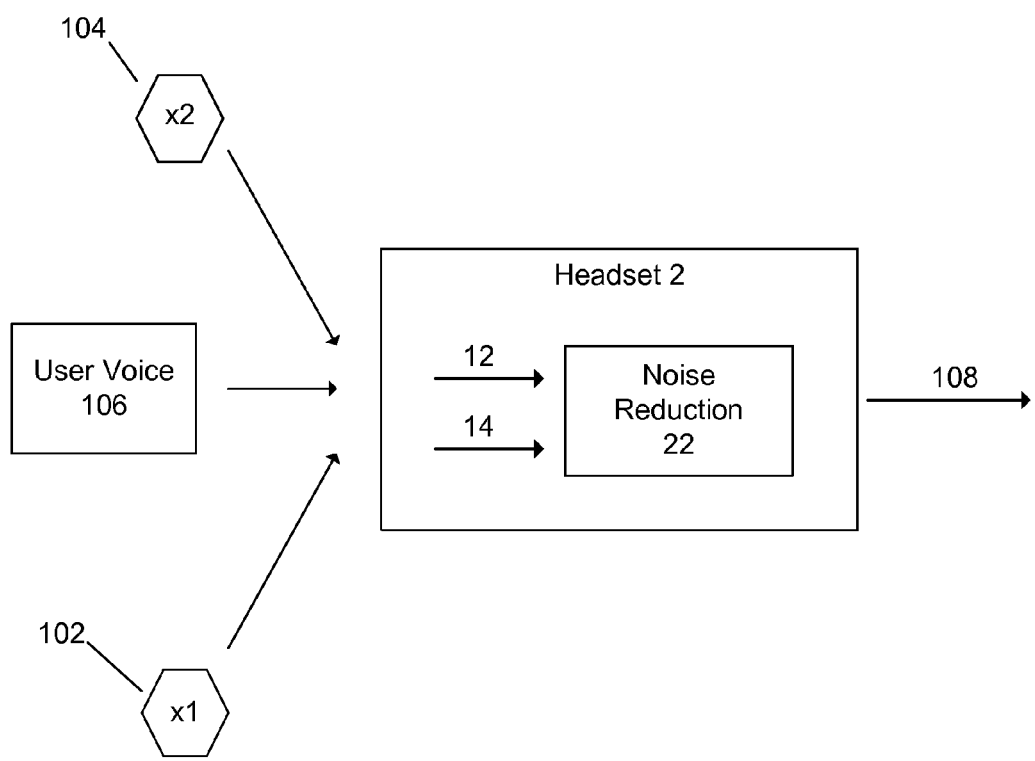
FIG. 8 is a usage scenario illustrating noise reduction in a high noise environment.

FIG. 8 illustrates noise reduction processing by headset 2 in normal operation mode in one example usage scenario. In operation, the headset 2 microphones receive undesired input from noise sources in addition to a desired user voice 106. For example, as shown in FIG. 8, noise sources may be represented as a noise source x1 102 and a noise source x2 104. Noise source x1 102 and noise source x2 104 may be either point noise sources or general background noise. In addition, the output of a far end user voice at the headset speaker may present an additional noise source at the headset microphones.

Noise reduction module 22 processes digital signal 12 and digital signal 14 generated as described in reference to FIG. 1. Utilizing noise subtraction, the noise source components x1 102 and x2 104 are processed and subtracted from digital signal 12 and digital signal 14. These techniques include several Widrow-Hoff style noise subtraction techniques where the voice amplitude and the noise amplitude are adaptively adjusted to minimize the combination of the output noise and the voice aberrations. A model of the noise signal produced by noise source x1 102 and noise source x2 104 is generated and utilized to cancel the noise signal in the signals detected at the headset 2. The synthesized noise model of noise source x1 102 and x2 represents the combination of the noise sources, where all the noise sources combined are treated as one noise source.

In spectral subtraction, the voice and noise components of digital signal 12 and digital signal 14 are decomposed into their separate frequency components and adaptively subtracted on a weighted basis. The weighting may be calculated in an adaptive fashion using an adaptive feedback loop.

Noise reduction module 22 includes a blind source separation algorithm and processes digital signal 12 and digital signal 14 to separate the signals of the noise sources from the different mixtures of the signals received by each microphone 4 and 6. In further examples, a microphone array with greater than two microphones is utilized, with each individual microphone output being processed. In this example, noise reduction module 22 includes a beamform voice processor and several beamform noise processors. Digital signal 12 and digital signal 14 are input into the beamform voice processor and each noise processor.

The digital signal 12 and digital signal 14 are electronically processed by the beamform voice processor and beamform noise processors to emphasize sounds from a particular location (e.g., the user's voice) and to de-emphasize sounds from other locations (e.g., noise sources x1 102 and x2 104). Each beamform noise processor is used to focus on a different point noise source and can be updated rapidly to isolate additional noise sources so long as the number of noise sources is equal to or less than the number of noise beamformers. The beamform voice processor outputs an enhanced voice signal and each beamform noise processor outputs an enhanced noise signal. Headset 2 may also utilize one or more voice activity detectors, echo controllers, and double talk detectors to generate processed signal 108 from digital signals 12 and 14.

Noise reduction module 22 may also utilize dynamic gain control, "noise gating" the output during unvoiced periods. When the user of headset 2 is silent, there is no output to the far end and therefore the far end user does not hear noise sources x1 102 and x2 104. The noise reduction techniques described herein are for example, and additional techniques known in the art may be utilized.

The output of noise reduction module 22 is a processed signal 108 which has substantially isolated voice and reduced noise due to the noise reduction techniques described herein. Processed signal 108 is sent to a far-end user.

Figure 9:
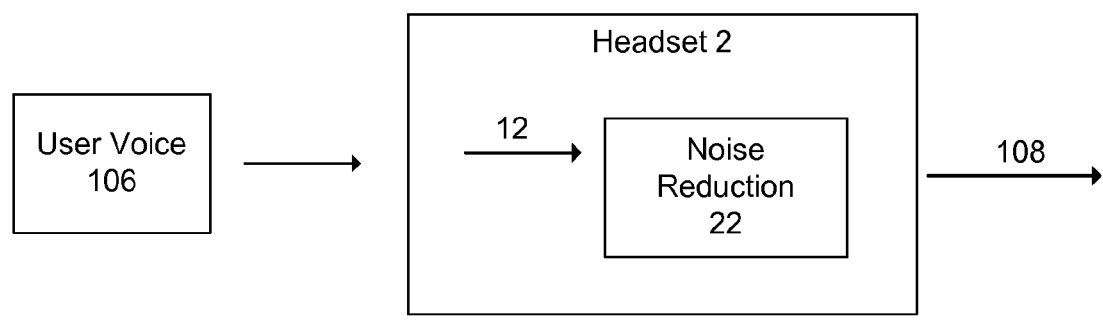
FIG. 9 is a usage scenario illustrating noise reduction in a low ambient noise environment.

FIG. 9 is a usage scenario illustrating noise reduction in a low ambient noise environment usage scenario, whereby the headset is operating in a power conservation mode. In operation, a headset 2 microphone receives input from a desired user voice 106. The headset 2 microphone may also receive minor peripheral noise. Noise reduction module 22 processes digital signal 12 using any noise reduction algorithm applicable to a single microphone output signal. The output of noise reduction module 22 is a processed signal 108 with reduced noise, but advantageously has been generated utilizing less power than normal operation mode. Processed signal 108 is sent to a far-end user.

The various examples described above are provided by way of illustration only and should not be construed to limit the invention. For example, although specific examples are directed at headsets, the apparatuses and methods described may be utilized in other mobile devices such as mobile telephones and smartphones. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of mobile device in which the apparatuses and methods are implemented, the specific high noise environment noise reduction algorithms employed in normal operation mode, and the specific lower noise environment noise reduction algorithms employed in power conservation mode. Furthermore, the functionality associated with any blocks described above may be centralized or distributed. It is also understood that one or more blocks of the mobile device may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A mobile communication device comprising:
a first microphone to output a first signal;
a second microphone to output a second signal;
a processor; and
a memory storing a power management module configured to monitor an ambient noise level utilizing the first signal or the second signal and responsive to the ambient noise level operate the mobile communication device in a normal operation mode or a power conservation mode, wherein the normal operation mode comprises implementing noise reduction processing using the first signal and the second signal and the power conservation mode comprises deactivating the second microphone and implementing noise reduction processing using the first signal, wherein the mobile communication device is operated in power conservation mode when the ambient noise level is below a predetermined noise level.

2. The mobile communication device of claim 1, wherein noise reduction processing using the first signal and the second signal comprises a fixed or adaptive blind source separation algorithm followed by spectral subtraction based single channel noise reduction.

3. The mobile communication device of claim 1, wherein the predetermined noise level is a predetermined average time weighted noise level is between approximately 50 dBspl(A) and 55 dBspl(A).

4. The mobile communication device of claim 1, wherein the first microphone and the second microphone are part of a microphone array, the microphone array comprising three or more microphones, wherein the normal operation mode comprises receiving signals from the three or more microphones in the microphone array and the power conservation mode comprises receiving only the first signal from the first microphone and deactivating the remaining microphones in the microphone array.

5. A mobile communication device comprising:
a first microphone to output a first signal;
a second microphone to output a second signal;
a processor; and
a memory storing a power management module configured to monitor an ambient noise level utilizing the first signal or the second signal and responsive to the ambient noise level operate the mobile communication device in a normal operation mode or a power conservation mode, wherein the normal operation mode comprises implementing noise reduction processing using the first signal and the second signal and the power conservation mode comprises deactivating the second microphone and implementing noise reduction processing using the first signal, wherein the mobile communication device is operated in power conservation mode when the ambient noise level is below a predetermined average time weighted noise level and has a peak to average noise ratio below a predetermined peak to average noise ratio.

6. The mobile communication device of claim 5, wherein the predetermined peak to average noise ratio is between approximately 6 dB and 12 dB.

7. A mobile communication device comprising:
a first microphone to output a first signal;
a second microphone to output a second signal;
a processor; and
a memory storing a power management module configured to monitor an ambient noise level utilizing the first signal or the second signal and responsive to the ambient noise level operate the mobile communication device in a normal operation mode or a power conservation mode, wherein the normal operation mode comprises implementing noise reduction processing using the first signal and the second signal and the power conservation mode comprises deactivating the second microphone and implementing noise reduction processing using the first signal, wherein the mobile communication device is operated in normal operation mode when the ambient noise level is above a predetermined average time weighted noise level or the ambient noise level has a peak to average noise ratio which exceeds a predetermined peak to average noise ratio.

8. The mobile communication device of claim 7, wherein the predetermined average time weighted noise level is between approximately 60 dBspl(A) and 65 dBspl(A).

9. The mobile communication device of claim 7, wherein the predetermined peak to average noise ratio is between approximately 6 dB and 12 dB.

10. A mobile communication device comprising:
a first microphone to output a first signal;
a second microphone to output a second signal;
a processor;
a memory storing a power management module configured to monitor an ambient noise level utilizing the first signal or the second signal and responsive to the ambient noise level operate the mobile communication device in a normal operation mode or a power conservation mode, wherein the normal operation mode comprises implementing noise reduction processing using the first signal and the second signal and the power conservation mode comprises deactivating the second microphone and implementing noise reduction processing using the first signal; and
a voice activity detector to determine a presence of user speech or absence of user speech in the first signal or the second signal, wherein the power management module switches between normal operation mode and power conservation mode only during absence of user speech.

11. A mobile communication device comprising:
a first microphone to output a first signal on a first signal processing path;
a second microphone to output a second signal on a second signal processing path;
a processor; and
a computer readable medium storing instructions that when executed by the processor cause the processor to monitor an ambient noise level and responsive to the ambient noise level switch between a dual microphone noise reduction processing mode and a single microphone noise reduction processing mode, wherein the second microphone and second signal processing path are deactivated in the single microphone noise reduction processing mode and single microphone noise reduction processing is applied to the first signal, wherein the single microphone noise reduction processing mode is utilized when the ambient noise level is below a predetermined noise level.

12. The mobile communication device of claim 11, wherein the predetermined noise level is a predetermined average time weighted noise level.

13. The mobile communication device of claim 12, wherein the dual microphone noise reduction processing mode is utilized when the ambient noise level is above a predetermined average time weighted noise level or the ambient noise level has a peak to average noise ratio which exceeds a predetermined peak to average noise ratio.

14. The mobile communication device of claim 13, further comprising a voice activity detector to determine a presence of user speech or absence of user speech in the first signal or the second signal, wherein switching between the dual microphone noise reduction processing mode and the single microphone noise reduction processing mode occurs only during absence of user speech.

15. A method for power conservation in a mobile communication device comprising:
receiving a first signal from a first microphone and a second signal from a second microphone;
monitoring an ambient noise level;
switching from a normal operation mode to a power conservation mode responsive to the ambient noise level satisfying a first predetermined condition, wherein switching to the power conservation mode comprises deactivating power to the second microphone and deactivating any noise reduction processing associated with the second signal, and processing the first signal using single microphone noise reduction processing to generate an output signal with reduced noise; and
switching from the power conservation mode to the normal operation mode responsive to the ambient noise level satisfying a second predetermined condition, wherein switching to the normal operation mode comprises activating power to the second microphone and processing the first signal and the second signal using dual microphone noise reduction processing to generate an output signal with reduced noise, wherein the first predetermined condition comprises an ambient noise level below a predetermined noise level.

16. The method of claim 15, wherein switching from a normal operation mode to a power conservation mode occurs at a predetermined release time.

17. The method of claim 16, wherein the predetermined release time is between approximately 15 and 20 seconds.

18. The method of claim 15, wherein switching from the power conservation mode to the normal operation mode occurs at a predetermined attack time.

19. The method of claim 18, wherein the predetermined attack time is between approximately 1 and 10 seconds.

20. A method for power conservation in a mobile communication device comprising:
receiving a first signal from a first microphone and a second signal from a second microphone;
monitoring an ambient noise level;
switching from a normal operation mode to a power conservation mode responsive to the ambient noise level satisfying a first predetermined condition, wherein switching to the power conservation mode comprises deactivating power to the second microphone and deactivating any noise reduction processing associated with the second signal, and processing the first signal using single microphone noise reduction processing to generate an output signal with reduced noise; and
switching from the power conservation mode to the normal operation mode responsive to the ambient noise level satisfying a second predetermined condition, wherein switching to the normal operation mode comprises activating power to the second microphone and processing the first signal and the second signal using dual microphone noise reduction processing to generate an output signal with reduced noise, wherein the first predetermined condition comprises an ambient noise level below a predetermined average time weighted noise level and an ambient noise level having a peak to average noise ratio below a predetermined peak to average noise ratio.

21. A method for power conservation in a mobile communication device comprising:
receiving a first signal from a first microphone and a second signal from a second microphone;
monitoring an ambient noise level;
switching from a normal operation mode to a power conservation mode responsive to the ambient noise level satisfying a first predetermined condition, wherein switching to the power conservation mode comprises deactivating power to the second microphone and deactivating any noise reduction processing associated with the second signal, and processing the first signal using single microphone noise reduction processing to generate an output signal with reduced noise; and
switching from the power conservation mode to the normal operation mode responsive to the ambient noise level satisfying a second predetermined condition, wherein switching to the normal operation mode comprises activating power to the second microphone and processing the first signal and the second signal using dual microphone noise reduction processing to generate an output signal with reduced noise, wherein the second predetermined condition comprises an ambient noise level above a predetermined average time weighted noise level or the ambient noise level having a peak to average noise ratio exceeding a predetermined peak to average noise ratio.

22. A method for power conservation in a mobile communication device comprising:
receiving a first signal from a first microphone and a second signal from a second microphone;
monitoring an ambient noise level;
switching from a normal operation mode to a power conservation mode responsive to the ambient noise level satisfying a first predetermined condition, wherein switching to the power conservation mode comprises deactivating power to the second microphone and deactivating any noise reduction processing associated with the second signal, and processing the first signal using single microphone noise reduction processing to generate an output signal with reduced noise;
switching from the power conservation mode to the normal operation mode responsive to the ambient noise level satisfying a second predetermined condition, wherein switching to the normal operation mode comprises activating power to the second microphone and processing the first signal and the second signal using dual microphone noise reduction processing to generate an output signal with reduced noise; and
determining a presence of user speech or absence of user speech, wherein switching from a normal operation mode to a power conservation mode or switching from the power conservation mode to the normal operation mode occurs only during absence of user speech.

\* \* \* \* \*